(12) United States Patent
Cumberland et al.

(10) Patent No.: US 7,718,227 B2
(45) Date of Patent: May 18, 2010

(54) FLEXIBLE THERMAL CONTROL COATINGS AND METHODS FOR FABRICATING THE SAME

(75) Inventors: Robert Cumberland, Malibu, CA (US); William B. Barvosa-Carter, Ventura, CA (US); Adam F. Gross, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 529 days.

(21) Appl. No.: 11/465,097

(22) Filed: Aug. 16, 2006

(65) Prior Publication Data

US 2008/0045639 A1    Feb. 21, 2008

(51) Int. Cl.
*B05D 3/02* (2006.01)
(52) U.S. Cl. ............ 427/372.2; 252/518.1; 252/519.33; 252/519.5; 427/515; 427/516; 524/437
(58) Field of Classification Search ................. 524/437; 252/519.33, 519.5, 518.1; 427/516, 515, 427/372.2
See application file for complete search history.

(56) References Cited

U.S. PATENT DOCUMENTS

| 5,589,274 A | 12/1996 | Long et al. |
| 5,807,909 A | 9/1998 | Cordaro et al. |
| 5,820,669 A | 10/1998 | Cordaro |
| 6,045,928 A | 4/2000 | Tsantrizos et al. |
| 6,099,637 A | 8/2000 | Cordaro |
| 6,124,378 A | 9/2000 | Cordaro et al. |
| 6,447,848 B1 | 9/2002 | Chow et al. |
| 6,576,290 B2 | 6/2003 | Cordaro et al. |
| 6,780,526 B2 | 8/2004 | Payne et al. |
| 6,917,347 B2 * | 7/2005 | Long et al. .................. 343/912 |
| 2004/0146752 A1 | 7/2004 | Axen et al. |

OTHER PUBLICATIONS

Cheng Hsieh, Metzler Ed, Forsberg Gus, McHugh Lisa, O'Donnell Tim, Cordaro James, Marinacci Loredana; Conductive White Thermal Control Paint For Spacecraft—Part 2; NASA, 1994.*

* cited by examiner

*Primary Examiner*—Randy Gulakowski
*Assistant Examiner*—Olatunde S Ojurongbe
(74) *Attorney, Agent, or Firm*—McNees Wallace & Nurick, LLC

(57) ABSTRACT

Flexible thermal control coatings for use on components of spacecraft and methods for fabricating such coatings are provided. In an exemplary embodiment, a flexible thermal control coating comprises a flexible organic binder for disposition on the component and an inorganic material having a radiation absorptance ($\alpha$) of less than about 0.2 and an emissivity ($\epsilon$) of at least about 0.6. The inorganic material and the organic binder are oriented relative to each other so that an exterior surface of the coating has a higher concentration of inorganic material than an interior surface of the coating and a lower concentration of organic binder than the interior surface.

19 Claims, 2 Drawing Sheets

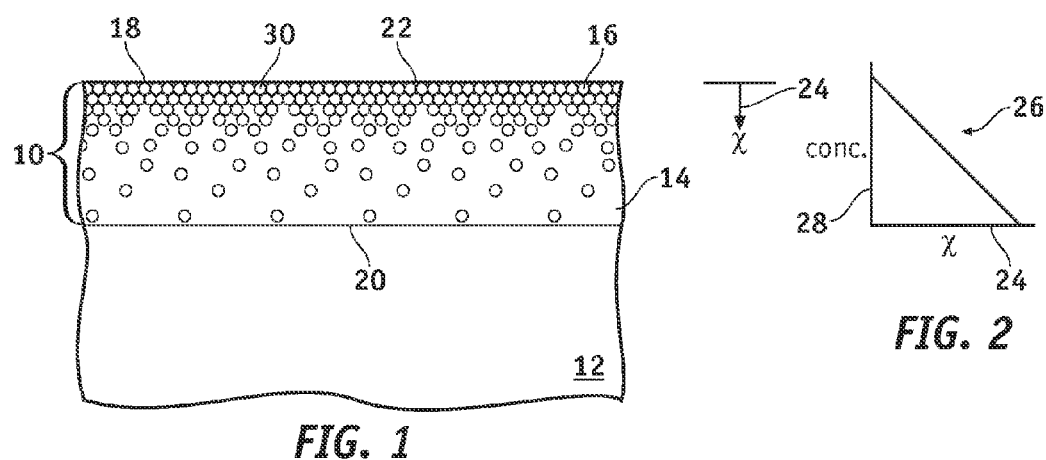
FIG. 1
FIG. 2
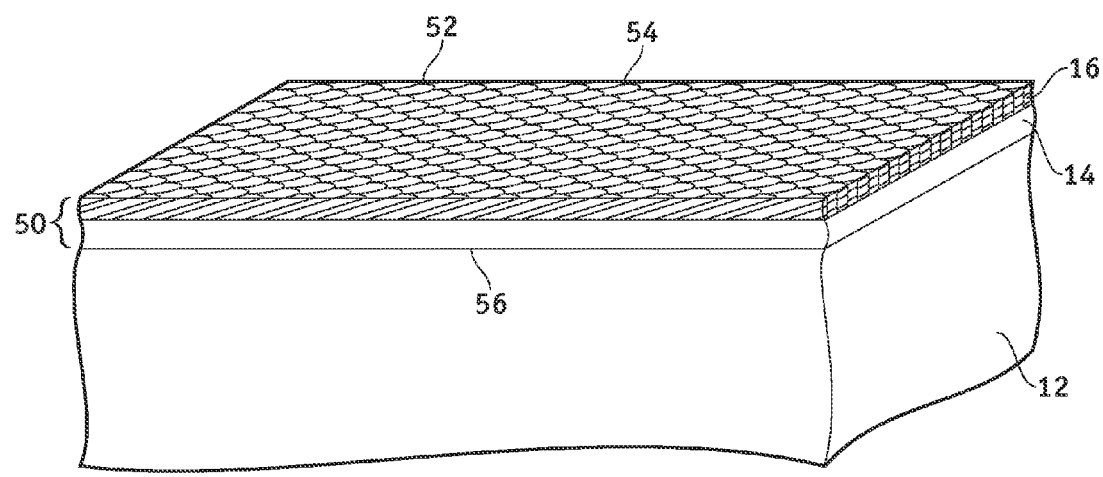
FIG. 3

US 7,718,227 B2

FLEXIBLE THERMAL CONTROL COATINGS AND METHODS FOR FABRICATING THE SAME

FIELD OF THE INVENTION

The present invention generally relates to thermal control coatings, and more particularly relates to flexible thermal control coatings and methods for fabricating flexible thermal control coatings suitable for spacecraft applications.

BACKGROUND OF THE INVENTION

Spacecraft, such as satellites and deep-space craft, are exposed to a wide range of thermal conditions during service. A side facing the sun is heated by absorption of direct solar radiation, while a side facing the void of space is cooled by emission of thermal radiation. If the temperature of the structure or payload becomes too hot or too cold, structural distortion can occur resulting in reduced system capability. Furthermore, payloads such as electronics, batteries and other critical systems can experience lower efficiency, non-operation, shortened lifetimes or failures. Thermal control of the spacecraft is therefore important. Various techniques have been developed to reduce temperature variations in external structural elements such as antennas and booms, and to maintain the interior of the spacecraft at a temperature suitable for sensitive equipment, payloads, and occupancy by human beings.

In one thermal control approach, the external surface of the spacecraft is covered with an inorganic white coating. The coating is designed to absorb very little solar radiation, yet efficiently radiate thermal energy in the infrared spectrum, thus biasing the overall temperature of the satellite structure on which it is disposed towards cooler temperatures. The coating is substantially stable to the radiation and low pressure gaseous environment encountered in space without losing its thermal properties by discoloring, darkening, or otherwise degrading over time in the harsh environment of low to high earth orbit. For some applications, the coating also must be sufficiently electrically conductive to dissipate electrostatic charge on the surface of the spacecraft.

While prior art inorganic coatings may work well to prevent overheating of rigid spacecraft structures, they tend to be brittle and impliable, making them unsuitable for use on inflatable structures, deployable structures, flexible structures, reconfigurable or movable structures, and the like. However, deployable, inflatable, reconfigurable, flexible, and/or movable structures are becoming more prevalent on spacecraft. While mechanically flexible thermal control coatings can be made from organic binders and resins, they are highly susceptible to darkening and degradation over time due to solar and other sources of radiation, which increases their solar radiation absorbance and therefore increases their surface temperatures eventually leading to abnormal functioning or even premature failure of spacecraft components.

Accordingly, it is desirable to provide flexible thermal control coatings suitable for use on deployable, inflatable, reconfigurable, movable, or otherwise flexible structures of spacecraft. In addition, it is desirable to provide flexible thermal control coatings that maintain low solar radiation absorbance and high infrared emissivity during extended exposure to space environments. It is also desirable to provide methods for fabricating such thermal control coatings. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In an exemplary embodiment of the invention, a flexible thermal control coating for use on a component of a spacecraft is provided. The flexible thermal control coating comprises a flexible organic binder for disposition on the component and an inorganic material having a radiation absorptance ($\alpha$) of less than about 0.2 and an emissivity ($\epsilon$) of at least about 0.6. The inorganic material and the organic binder are oriented relative to each other so that an exterior surface of the coating has a higher concentration of inorganic material than an interior surface of the coating and a lower concentration of organic binder than the interior surface.

In accordance with another exemplary embodiment of the invention, a method for fabricating a flexible thermal control coating on a substrate is provided. The method comprises preparing an inorganic material having a radiation absorbance ($\alpha$) of less than about 0.2 and an emissivity ($\epsilon$) of at least about 0.6. An organic binder is applied to the substrate, the inorganic material is disposed onto the organic binder, and the organic binder is cured.

In accordance with a further exemplary embodiment of the invention, a method for fabricating a flexible thermal control coating on a component of a spacecraft is provided. The method comprises fabricating a first surface of the flexible thermal control coating on the component and fabricating a second surface of the flexible thermal control coating so that the second surface of the coating has a higher concentration of an inorganic material than the first surface of the coating and a lower concentration of an organic binder than the first surface. The first surface is cured after fabricating the second surface.

BRIEF DESCRIPTION OF THE DRAWINGS

The present invention will hereinafter be described in conjunction with the following drawing figures, wherein like numerals denote like elements, and wherein:

FIG. 1 is a cross-sectional view of a flexible thermal control coating in accordance with an exemplary embodiment of the present invention;

FIG. 2 is a diagram illustrating the concentration gradient profile of the inorganic material in the thermal control coating of FIG. 1;

FIG. 3 is a cross-sectional view of a flexible thermal control coating in accordance with another exemplary embodiment of the present invention;

DETAILED DESCRIPTION OF THE INVENTION

Figure 4:
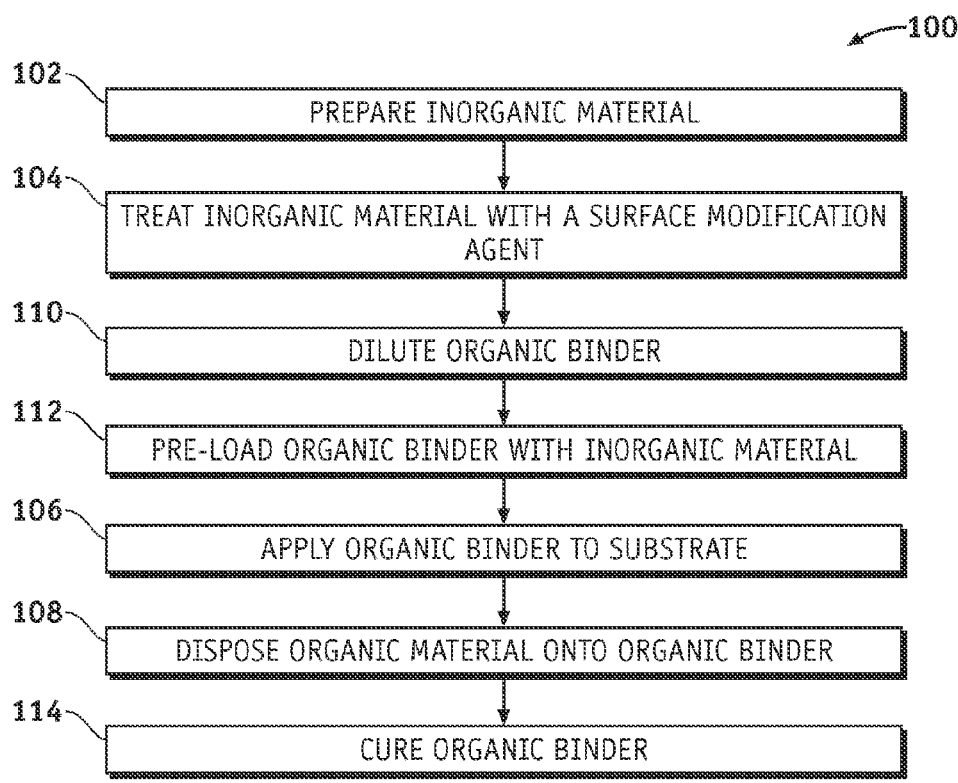
FIG. 4 is a flowchart of a method for fabricating a flexible thermal control coating in accordance with an exemplary embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a flexible thermal control coating 10, in accordance with an exemplary embodiment of the present invention, comprises a flexible organic binder 14 that is disposed on a substrate 12. The substrate 12 may be any suitable component of a spacecraft for which thermal control is desired. In particular, substrate 12 may be any flexible component of a spacecraft, such as, for example, an inflatable component (e.g., a panel, truss, or array), a sun shield (such as for deployable arrays, reflectors, or reconfigurable reflectors), or a thermal blanket. The flexible thermal control coating 10 further comprises an inorganic material 16 that is disposed at an exterior surface 18 of and within organic binder 14. Inorganic material 16 has a radiation absorptance ($\alpha$) of less than about 0.2 and an emissivity ($\epsilon$) of at least about 0.6, preferably at least about 0.7. In this manner, coating 10 is a relatively poor absorber of solar radiation, yet radiates thermal energy efficiently in the infrared spectrum, thus biasing the overall temperature of the substrate 12 towards cooler temperatures. Because inorganic material 16 is bound to substrate 12 via flexible organic binder 14, it is able to flex as organic binder 14 and substrate 12 flex. As illustrated in FIG. 1, inorganic material 16 is formed of fine particles 30 that are not bound together and that have particle sizes that are sufficiently small such that exterior surface 18 does not significantly crack when flexed. In a preferred embodiment of the invention, particles 30 of inorganic material 16 has a particle size less than about 1 millimeter (mm). In a more preferred embodiment of the invention, particles 30 have a particle size of about 100 micrometer ($\mu$m) or less.

An exterior surface 22 of coating 10 has a greater concentration of inorganic material 16 than an interior surface 20 of coating 10. As illustrated in FIGS. 1 and 2, in one exemplary embodiment of the invention, the concentration of inorganic material 16 within organic binder 14, represented by the y-axis 28 of FIG. 2, is graded, that is, it decreases as the distance x, illustrated by reference numeral 24, from exterior surface 22 increases. While the concentration gradient of inorganic material 16 is illustrated in FIG. 2 with a linear profile 26, it will be appreciated that the invention is not so limited and the concentration gradient may have any suitable profile. Because a higher concentration of inorganic material is disposed at the exterior surface 22 of coating 10, the inorganic material protects the organic binder from solar radiation degradation. Thus, flexible thermal control coating 10 is able to withstand the effects of solar radiation and provide thermal control for substrate 12 while also flexing with substrate 12 without significant cracking, breaking, or chipping.

FIG. 3 illustrates a flexible thermal control coating 50 in another exemplary embodiment of the present invention. Flexible thermal control coating 50 is similar to flexible thermal control coating 10 of FIG. 1 to the extent that it also comprises an inorganic material 16 and an organic binder 14 that binds the inorganic material 16 to a substrate 12. Accordingly, elements of FIG. 3 that have the same reference numbers as elements of FIG. 1 are the same elements of FIG. 1. For example, substrate 12 of FIG. 3 can be any of the components or structures described above for substrate 12 of FIG. 1. In addition, as with inorganic material 16 of coating 10 shown in FIG. 1, inorganic material 16 of FIG. 3 has a radiation absorptance ($\alpha$) of less than about 0.2 and an infrared radiation emissivity ($\epsilon$) of at least about 0.6, preferably at least about 0.7.

The organic binder 14 of flexible thermal control coating 50 is disposed on substrate 12 in any suitable configuration. For example, organic binder 14 may be disposed on substrate 12 as a continuous film. Alternatively, organic binder 14 may be disposed on substrate 12 in discontinuous "dots", spots, or islands (hereinafter, referred to collectively as "islands"). Inorganic material 16 is bound to substrate 12 by organic binder 14 and may be configured as partially overlapping platelets 54, tiles, discs, or scales (hereinafter, referred to collectively as "platelets"), analogous to the overlapping scales of a reptile. In this manner, the inorganic platelets 54 forming, at least primarily, an exterior surface 52 of coating 50 at least substantially protect the flexible organic binder 14, disposed at an interior surface 56, from solar radiation degradation. In addition, because the platelets overlap, the inorganic material 16 at exposed surface 52 of the coating 50 is able to flex with the flexing of organic binder 14 and substrate 12 without significant cracking, breaking, or chipping. If the interior surface 56 should stretch or expand by a large margin (e.g. inflation), the platelets can be configured with a large enough degree of overlap to ensure that the exterior surface 52 is still composed entirely of overlapping inorganic platelets 54 and the interior surface 56 is not exposed to radiation. While FIGS. 1-3 illustrate various exemplary embodiments of the present invention, it will be appreciated that the invention is not so limited and that the invention includes any other thermal control coating having a flexible exterior surface that is primarily inorganic (and, hence, radiation resistant) and an interior surface adjacent to a substrate that is primarily organic (and, hence, flexible).

Figure 5:
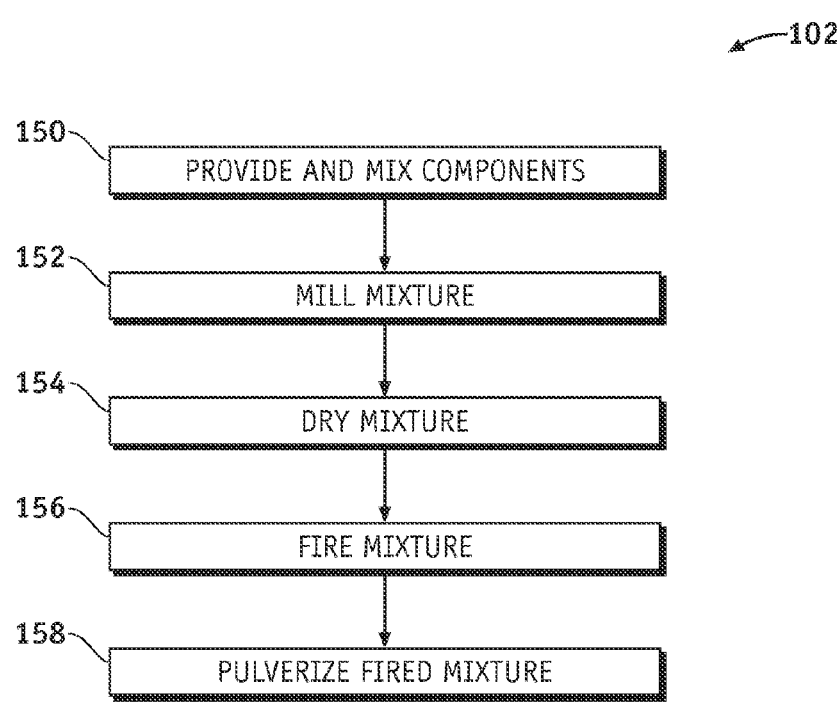
FIG. 5 is a flowchart of a method for preparing inorganic material used in the method illustrated in FIG. 4.

FIG. 4 illustrates a method 100 for fabricating a flexible thermal control coating, such as coating 10 or coating 50, in accordance with an exemplary embodiment of the present invention. The method comprises the step of preparing the inorganic material (step 102). The various sub-steps of step 102 are illustrated in FIG. 5. To prepare the inorganic material, the components are provided and mixed together (step 150). Any suitable inorganic material that has an optical absorbance of less than about 0.2 and an infrared emissivity of at least about 0.6 may be used. Examples of suitable inorganic materials include zinc oxide and aluminum oxide. In a preferred embodiment of the invention, in the most general form, the inorganic material has a composition stated by A[Al$_x$Ga$_{(1-x)}$]$_2$O$_4$($\delta$D), wherein A is zinc, magnesium, or cadmium, D is a cationic dopant having an ionic valence greater than +2 or an anionic dopant, the value of x is from 0 to 1, and the value of $\delta$ is from 0 to about 0.2 (i.e., 20 atomic percent). The dopant D, where present, is preferably indium, supplied as indium oxide. The composition of the inorganic material is selected from this formulation, and may be any composition within this range.

Preferably, A is zinc, and the application of the invention will be discussed primarily in terms of this preferred embodiment. In this preferred embodiment, if x and $\delta$ are both 0, the composition is the undoped ZnGa$_2$O$_4$, a material termed a zinc gallate. If x is 1 and $\delta$ is 0, the composition is undoped ZnAl$_2$O$_4$, a material termed a zinc aluminate. If x is between 0 and 1, and $\delta$ is 0, the composition is the undoped Zn[Al$_x$Ga$_{(1-x)}$]$_2$O$_4$, a material termed a zinc aluminate-gallate. Indium-doped versions of all of these compositions may be made by making $\delta$ nonzero, but no greater than the maximum value of about 0.2 indicated above. There may be minor substitutions for the zinc, aluminum, and gallium cations in the formulation, as long as these substitutions result in a single phase, solid solution material. For example, cadmium may be substituted for a portion of the zinc, producing (Zn,Cd)[Al$_x$Ga$_{(1-x)}$]$_2$O$_4$($\delta$D).

The compositions of the form Zn[Al$_x$Ga$_{(1-x)}$]$_2$O$_4$($\delta$D) are of the spinel crystal structure and are solid solutions based upon the end point compositions ZnGa$_2$O$_4$ and ZnAl$_2$O$_4$. As used herein, "spinel" includes normal spinels, inverse spinels, and mixtures thereof. In the normal spinel structure, generally notated as AB$_2$O$_4$, oxygen anions form a face-centered-cubic close packed structure, with the zinc atoms in the tetrahedral A sites and the aluminum and/or gallium atoms in the octahedral B sites. In the inverse spinel structure, also of the $AB_2O_4$ type but sometimes represented as $B(AB)O_4$, the distribution of zinc and aluminum and/or gallium in the tetrahedral and octahedral sites is altered. In the inverse spinel, all of the A ions and one-half of the B ions are on the octahedral sites, while the remaining half of the B ions are on the tetrahedral sites, hence the notation $B(AB)O_4$. The normal spinel and inverse spinel structures represent end points of a continuum, so that, for example, a particular composition may be a mixture of 95% normal spinel and 5% inverse spinel. All of the normal spinel, inverse spinel, and mixtures thereof, having the composition $Zn[Al_xGa_{(1-x)}]_2O_4(\delta D)$ are within the scope of the invention.

To increase the electrical conductivity (or, alternatively stated, reduce the electrical resistivity), the composition may be doped with a semiconductor material. If the composition is to be doped, it is doped with a cationic dopant having a valence of greater than +2, or an anionic dopant. Preferably, the doping is with indium to produce a composition $Zn[Al_xGa_{(1-x)}]_2O_4(\delta In)$, where $\delta$ is less than 0.2 (i.e., 20 atomic percent).

In addition to the described $A[Al_xGa_{(1-x)}]_2O_4(\delta D)$ inorganic component, the inorganic material may contain active or inert secondary particles to modify the optical properties and/or the mechanical properties of the final inorganic material. Active secondary particles interact optically with incident energy, and include, for example, aluminum-doped zinc oxide particles. Such active secondary particles may be utilized to improve the low-temperature electrical conductivity at the expense of optical properties, for particular applications. Inert secondary particles are those which serve primarily as filler to increase the volume fraction of particulate material present without greatly modifying the optical properties. Inert secondary particles can include, for example, barium sulfate, clay, or talc.

As stated above, to prepare the inorganic material the components of the inorganic material are provided and mixed together (step 150). In the preferred formulation procedure, readily available components ZnO, $Al_2O_3$, $Ga_2O_3$, and $In_2O_3$ are used as starting materials. Thus, to prepare $ZnAl_2O_4$, equal molar quantities of ZnO and $Al_2O_3$ are mixed together. To prepare $ZnGa_2O_4$, equal molar quantities of ZnO and $Ga_2O_3$ are mixed together. To prepare $Zn[Al_xGa_{(1-x)}]_2O_4$, ZnO, $Al_2O_3$, and $Ga_2O_3$ are mixed together with a molar ratio of 1:x:(1−x), respectively, with 0<x<1. If any of these compositions is to be doped with indium, the appropriate amount of $In_2O_3$ is added to the mixture. A mixing medium, which later is removed, may be added to promote the mixing of the components. Preferably, water is used as the mixing medium.

The components and the mixing medium are milled together to form a mechanical mixture (step 152). After milling is complete, the mixing medium is removed by evaporation (step 154). The dried mixture is fired to chemically react the components together at a temperature that is preferably in the range of from about 1000° C. to about 1300° C. (step 156). A preferred firing treatment is 1160° C. for 6-12 hours in air. After cooling the agglomerated mass resulting from the firing is lightly pulverized, as with a mortar and pestle (step 158). The resulting particulate has a size range of less than 1 mm, preferably no greater than about 100 μm.

The following is an example of the preparation of $Zn(Al_{0.5}Ga_{0.5})_2O_4$ according to the procedure discussed above. A mixture of 44.995 g of ZnO powder, 28.185 g of $Al_2O_3$ powder and 51.82 g of $Ga_2O_3$ was weighed and mixed. The powders were added to a jar mill containing Burundum™ milling media. A milling aid of 300 milliliters of water was added to the jar mill. The jar mill was sealed and the jar was rotated to mill the mixture for 24 hours, resulting in a homogeneous mixture. The slurried mixture was removed from the jar mill and placed into a pneumatically stirred container until the mixture was dried. The resulting ceramic cake was lightly pulverized with a mortar and pestle. The pulverized material was fired in an oven in air at 1160° C. for 12 hours, producing the undoped $Zn(Al_{0.5}Ga_{0.5})_2O_4$ material. The resulting ceramic cake was lightly pulverized in a mortar and pestle, resulting in powdered inorganic material.

Referring back to FIG. 4, in an optional embodiment of the invention, during or after preparation of the inorganic material, the inorganic material can be treated with a surface modification agent to chemically bond the inorganic material particles to an organic resin, which is discussed in more detail below (step 104). Suitable surface modification agents include any alkoxy silane terminated with an epoxy, amino, or vinyl group. Examples of suitable surface modification agents include Dow Corning® Z-6070, a methyltrimethoxysilane, available from Dow Corning Corporation of Midland, Mich. glycidoxypropyltrimethoxysilane, and vinyltrimethoxy silane.

The following is an example of the treatment of the inorganic material with a surface modification agent. A solution of 95% (by volume) ethanol and 5% (by volume) $H_2O$ was acidified with acetic acid to a pH of 5.5. Dow Corning® Z-6070 was added to the ethanol/water mixture to form a 2% (by volume) solution. $Zn(Al_{0.5}Ga_{0.5})_2O_4$ powder was added and the solution was stirred for about 10 minutes. The resulting product was rinsed with ethanol and cured at 110° C. for 10 minutes.

In accordance with an exemplary embodiment of the invention, the method further comprises the step of applying an organic binder to the substrate (step 106). The organic binder is selected for its flexible properties and to provide good adherence of the inorganic material to the substrate. The binder is preferably cross-linked and polymerized dimethyl silicone copolymer, which is flexible and partially resistant to degradation in ultraviolet (UV) light. The silicone polymer exhibits a good degree of elastic deformation without cracking, both when the inorganic material is present and when it is not present. This reversible eleastic deformation permits the thermal control coating of the present invention to conform with the bending of the substrate. An example of an organic binder suitable for use in the present invention is Dow Corning® HC 2000, a flexible silicone-based binder, available from Dow Corning Corporation of Midland, Mich. Other flexible polymeric materials may be used for the organic binder, including, but not limited to, epoxy resin, silicone-modified epoxy, polyurethane, poly(dimethylsiloxane), poly (dimethylsiloxane-co-methylphenylsiloxane), polyamide, polyimide, polyamide-imide, and combinations thereof.

In an exemplary embodiment of the invention, the organic binder may be applied to the substrate using any suitable method that provides a film with a uniform thickness, such as the organic resin film 14 of FIG. 1. Examples of such methods include spraying or painting the organic binder onto the substrate or dip-coating the substrate with the binder. In addition, the binder can be doctor bladed to achieve further thickness uniformity and smoothness of the binder surface. The organic binder can be applied to the substrate so as to have any suitable thickness. In one exemplary embodiment, the organic binder has a thickness no greater than 150 μm. In a preferred exemplary embodiment, the organic binder has a thickness in the range of about 25 to about 125 μm.

The method continues with the disposition of the inorganic material onto the organic binder (step 108). In accordance with an exemplary embodiment of the invention, the inorganic material is applied to the organic binder by spraying, sprinkling, airbrushing, or dusting powdered inorganic material onto the organic binder. The inorganic powder is applied to the binder before the organic binder is permitted to cure to maximize adhesion of the powder to the substrate. A sufficient amount of inorganic powder is applied to the binder so that the final thermal control coating has the desired radiation absorbance properties and emissivity properties. Any excess inorganic powder that does not adhere to the substrate via the resin may be removed from the surface of the binder by wiping the excess off, blowing the excess off, or the like. Disposition of the inorganic material onto the organic binder in this manner results in a final thermal control coating that has an exterior surface that is primarily inorganic in nature. The inorganic material is substantially resistant to degradation in a space environment. This allows the inorganic material at the exterior surface of the coating to mask or shield the underlying flexible organic binder, thus protecting the organic binder from radiation degradation. In addition, by applying the inorganic material to the organic binder after the binder is applied to the substrate, a larger and/or more efficient amount of inorganic material may be used in the coating. If the same amount of inorganic material were added to the organic binder before it is applied to the substrate, the coating could be too viscous to apply evenly to the substrate. In a preferred embodiment of the invention, the inorganic material is applied to and across the organic binder at a low velocity so that its application has no adverse effect on the thickness uniformity of the final thermal control coating.

Disposition of the inorganic material to the organic binder as described above results in a graded concentration of the inorganic material in the organic binder, with a sharp increase of the inorganic material concentration at the exterior surface of the thermal control coating. In an optional embodiment of the present invention, before application of the organic binder to the substrate, the organic binder can be diluted with a fluid so that the organic binder has a lower viscosity (step 110). In this manner, once the organic binder is applied to the substrate and the inorganic material is disposed on the binder, the inorganic material particles will sink further into the binder before the binder cures, resulting in a thermal control coating having an inorganic material concentration gradient that gradually increases from the substrate. Accordingly, the profile of the concentration gradient can be tuned by adjusting the dilution factor of the resin. In other words, the more diluent that is added to the binder, the lower the binder viscosity will be and the smoother the concentration gradient of the inorganic material will be. Any silicone-based fluid that is inert in the organic binder and is substantially fully immiscible may be used to dilute the organic binder. Suitable fluids for diluting the binder include, but are not limited to, xylenes and methyl siloxanes such as Dow Corning® OS10 fluid, a low molecular weight siloxane, and Dow Corning® OS20 fluid, a low molecular weight siloxane.

In another optional embodiment of the invention, before application of the organic binder to the substrate, the organic binder can be pre-loaded with the inorganic material (step 111). In this manner, the pre-loaded organic binder will have greater resistance to radiation degradation than organic binder that is not pre-loaded. In an exemplary embodiment of the invention, the amount of inorganic material that is added to the organic binder during pre-loading is sufficiently large so that the organic binder achieves enhanced radiation degradation resistance but is sufficiently low so that the organic binder remains sufficiently viscous so that it can be applied evenly to a substrate and so that it does not become either brittle or inflexible upon curing. In a preferred embodiment of the invention, the inorganic material is added so that the inorganic material: organic binder ratio is in the range of about 2:1 to about 3:1. In another exemplary embodiment, the organic binder can be diluted before pre-loading. Diluting the organic binder, as described above, will allow the inorganic binder to be pre-loaded with a greater amount of the inorganic material than if the binder was not diluted. The organic binder can be pre-loaded by adding the inorganic powder to the organic binder and sufficiently mixing the binder so that the inorganic powder is evenly distributed throughout.

In another exemplary embodiment of the invention, the organic binder, whether pre-loaded or not, can be applied to the substrate in discontinuous dots, spots or islands using any suitable tool or method. The inorganic material is pressed or otherwise formed into platelets, tiles, dots, scales, or the like, which then can be disposed in an overlapping configuration on the organic binder, as illustrated in FIG. 3. It will be appreciated that any other method may be used for applying the inorganic material to the organic binder to produce a thermal control coating having an exterior surface that is primarily inorganic (and, hence, radiation resistant) and an interior surface adjacent to the substrate that is primarily organic (and, hence, flexible).

In another exemplary embodiment of the invention, the inorganic material is applied as a continuous external coating over the organic binder. In this embodiment, as the composite coating is flexed and stretched, the external inorganic material is allowed to naturally crack into islands. As the coating is flexed and stretched, the islands will move apart; as the coating is relaxed back to its initial configuration, the islands will move back together and provide a continuous coating. During the flexing and stretching, the islands move apart and reveal a small area fraction of organic binder beneath. This embodiment is particularly suitable for structures that must be stretched or flexed to be stowed and then un-stretched or un-flexed to be deployed.

In a further exemplary embodiment of the invention, several layers of organic and inorganic material may be disposed on the substrate. In this regard, if inorganic material is lost or abraded from the top surface of the coating, inorganic layers are revealed that provide a similar or the same function.

Referring again to FIG. 4, once the inorganic material is disposed on the organic binder, the organic binder is cured (step 114). The organic binder is cured using any method that is suitable for the chemical composition of the organic binder used. The curing time may depend not only on the organic binder chemistry, but also on thermal treatment and whether the organic binder has been diluted or pre-loaded, as described above. In an exemplary embodiment of the invention, the organic binder is cured by air drying for a suitable time period.

Accordingly, flexible thermal control coatings and method for fabricating flexible thermal control coatings have been provided. The coatings are suitable for controlling the temperature of flexible, deployable, movable, or reconfigurable structures in space and preventing degradation of the structures due to solar radiation. The coatings are flexible while also resistant to significant degradation due to long-term exposure to the space environment. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A flexible thermal control coating for use on a component of a spacecraft, the flexible thermal control coating comprising:
   a flexible organic binder disposed overlying the component; and
   an inorganic material having a radiation absorptance ($\alpha$) of less than 0.2 and an emissivity ($\epsilon$) of at least 0.6;
   wherein the flexible thermal control coating comprises a single layer having a first surface and a second surface; and
   wherein the inorganic material and the organic binder are oriented relative to each other so that the second surface of the coating has a higher concentration of inorganic material than the first surface of the coating and a lower concentration of organic binder than the first surface.

2. The flexible thermal control coating of claim 1, wherein the flexible organic binder has a graded concentration of inorganic material therein.

3. The flexible thermal control coating of claim 1, wherein the inorganic material is configured as overlapping platelets that are disposed on the organic binder.

4. The flexible thermal control coating of claim 3, wherein the inorganic material is disposed as a layer on the organic binder.

5. The flexible thermal control coating of claim 1, wherein the inorganic material has a composition of $A[Al_xGa_{(1-x)}]_2O_4$ ($\delta D$), wherein A is selected from the group consisting of zinc, magnesium, and cadmium, D is a cationic dopant having an ionic valence greater than +2 or an anionic dopant, the value of x is from 0 to less than 1, and the value of $\delta$ is from 0 to about 0.2.

6. The flexible thermal control coating of claim 1, wherein the organic binder comprises a dimethyl silicone copolymer, epoxy resin, silicone-modified epoxy, polyurethane, poly(dimethylsiloxane), poly(dimethylsiloxane-co-methylphenylsiloxane), polyamide, polyimide, polyamide-imide, or a combination thereof.

7. The flexible thermal control coating of claim 1, wherein the inorganic material comprises an alkoxy silane terminated with an epoxy, amino, or vinyl group.

8. A method for fabricating a flexible thermal control coating on a substrate, the method comprising the steps of:
   preparing an inorganic material having a radiation absorptance ($\alpha$) of less than 0.2 and an emissivity ($\epsilon$) of at least 0.6;
   applying an organic binder to the substrate;
   disposing the inorganic material onto the organic binder after the organic binder is applied to the substrate; and
   curing the organic binder to form the flexible thermal control coating comprising a single layer having a first surface and a second surface.

9. The method of claim 8, further comprising the step of treating the inorganic material with a surface modification agent before the step of disposing the inorganic material onto the organic binder, wherein the surface modification agent is an alkoxy silane terminated with an epoxy, amino, or vinyl group.

10. The method of claim 8, further comprising the step of diluting the organic binder before the step of applying the organic binder to the substrate.

11. The method of claim 8, further comprising the step of pre-loading the organic binder with the inorganic material before the step of applying the organic binder to the substrate.

12. The solar method of claim 8, wherein the step of disposing the inorganic material onto the organic binder comprises the step of disposing a powder of inorganic material onto a continuous film of the organic binder.

13. The method of claim 8, wherein
   the step of preparing an inorganic material comprises the step of preparing the inorganic material into a plurality of platelets;
   the step of applying an organic binder to the substrate comprises applying discontinuous islands of the organic binder to the substrate; and
   the step of disposing the inorganic material onto the organic binder comprises the step of disposing the platelets onto the discontinuous islands of the organic binder.

14. The method of claim 8, wherein the step of preparing the inorganic material comprises the step of preparing an inorganic material having a composition of $A[Al_xGa_{(1-x)}]_2O_4$ ($\delta D$), wherein A is selected from the group consisting of zinc, magnesium, and cadmium, D is a cationic dopant having an ionic valence greater than +2 or an anionic dopant, the value of x is from 0 to less than 1, and the value of $\delta$ is from 0 to about 0.2.

15. The method of claim 8, wherein the step of applying an organic binder to the substrate comprises the step of applying a dimethyl silicone copolymer to the substrate.

16. A method for fabricating a flexible thermal control coating on a component of a spacecraft, the method comprising the steps of:
   fabricating a first surface of the flexible thermal control coating on the component;
   fabricating a second surface of the flexible thermal control so that the second surface of the coating has a higher concentration of an inorganic material than the first surface of the coating and a lower concentration of an organic binder than the first surface; and
   curing the first surface after fabricating the second surface;
   wherein the flexible thermal control coating comprising the first surface and the second surface is a single layer.

17. The method of claim 16, wherein the step of fabricating a first surface comprises the step of applying the organic binder as a continuous film.

18. The method of claim 17, wherein the step of fabricating a second surface comprises the step of disposing a powder of the inorganic material to the organic binder.

19. The method of claim 16, wherein the step of fabricating a first surface comprises the step of applying the organic binder as a plurality of discontinuous islands and the step of fabricating a second surface comprises the step of disposing a plurality of platelets of the inorganic material onto the plurality of discontinuous islands so that the platelets partially overlap adjacent islands.

* * * * *